United States Patent
Tamaki et al.

(10) Patent No.: US 7,855,241 B2
(45) Date of Patent: Dec. 21, 2010

(54) METHOD OF IMPROVING ABRASION RESISTANCE OF PLASTIC ARTICLE USING NANOPARTICLES AND ARTICLE PRODUCED THEREBY

(75) Inventors: Ryo Tamaki, Clifton Park, NY (US); Steven Thomas Rice, Scotia, NY (US); Hieu Minh Duong, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 1278 days.

(21) Appl. No.: 11/253,117

(22) Filed: Oct. 18, 2005

(65) Prior Publication Data

US 2007/0088095 A1 Apr. 19, 2007

(51) Int. Cl.
- C08F 2/46 (2006.01)
- C08J 3/28 (2006.01)
- B32B 27/16 (2006.01)
- B32B 27/18 (2006.01)
- B32B 27/36 (2006.01)
- B32B 27/38 (2006.01)

(52) U.S. Cl. .............. 522/81; 522/74; 522/75; 522/77; 522/79; 522/82; 522/83; 522/100; 522/104; 522/153; 522/154; 522/163; 522/162; 522/170; 522/183; 524/1; 524/700; 524/773; 524/779; 524/789; 524/790; 428/402; 428/403; 428/404; 428/405; 428/407; 428/412; 264/340

(58) Field of Classification Search .............. 522/74, 522/75, 77, 79, 80, 81, 82, 83, 99, 148, 172, 522/163; 526/1, 6, 314; 428/402, 403, 404, 428/405, 407

See application file for complete search history.

(56) References Cited

U.S. PATENT DOCUMENTS

| | | | |
|---|---|---|---|
| 3,986,997 A | 10/1976 | Clark | |
| 4,027,073 A | 5/1977 | Clark | |
| 4,238,596 A | 12/1980 | Quinn | |
| 4,238,597 A | 12/1980 | Markezich et al. | |
| 4,239,798 A | 12/1980 | Schroeter et al. | |
| 4,410,594 A | 10/1983 | Olson | |
| 4,503,126 A | 3/1985 | Phillips et al. | |
| 5,318,827 A | 6/1994 | Logan et al. | |
| 6,265,061 B1 * | 7/2001 | Kang et al. | 428/323 |
| 6,294,647 B1 | 9/2001 | Brunelle et al. | |
| 6,306,507 B1 | 10/2001 | Brunelle et al. | |
| 6,387,379 B1 | 5/2002 | Goldberg et al. | |
| 6,492,481 B1 | 12/2002 | Davis et al. | |
| 6,596,843 B2 | 7/2003 | Brunelle et al. | |
| 2005/0113535 A1 * | 5/2005 | Glasgow et al. | 525/462 |
| 2007/0178263 A1 * | 8/2007 | Guilleux et al. | 428/35.2 |
| 2008/0214698 A1 * | 9/2008 | Baran, Jr et al. | 523/206 |

FOREIGN PATENT DOCUMENTS

| | | | |
|---|---|---|---|
| JP | 01075521 | | 3/1989 |
| JP | 02191618 | | 7/1990 |
| JP | 02208325 | | 8/1990 |
| JP | 03296536 | | 12/1991 |
| JP | 2000080181 A | * | 3/2000 |
| JP | 2005281370 A | * | 10/2005 |

OTHER PUBLICATIONS

International Search Report dated Mar. 2, 2007.

* cited by examiner

*Primary Examiner*—Sanza L McClendon
(74) *Attorney, Agent, or Firm*—Cantor Colburn LLP

(57) ABSTRACT

The invention includes embodiments that relate to a method of improving the abrasion resistance of a plastic article. The method comprises: (a) providing a composition comprising at least one e-beam active nanoparticle compound and at least one thermoplastic polymeric material; (b) forming an article from the composition of step (a); and (c) exposing the article formed in step (b) to an electron beam source. The invention also includes embodiments that relate to an article comprising an abrasion resistant surface.

30 Claims, No Drawings

METHOD OF IMPROVING ABRASION RESISTANCE OF PLASTIC ARTICLE USING NANOPARTICLES AND ARTICLE PRODUCED THEREBY

BACKGROUND

The invention includes embodiments that relate to a method of improving the abrasion resistance of a plastic article. The invention also includes embodiments that relate to an article comprising an abrasion resistant surface.

Thermoplastic polymers such as polycarbonate (PC) and resorcinol polyarylate-polycarbonate copolymers (SLX) are prone to scratch and mar type damage. Often, the susceptibility of a polymer to scratching or marring can severely limit its utility in commercial applications requiring a scratch-free or mar-free appearance.

To avoid or at least minimize scratch and mar damage, hard coatings have been applied on the surface of a variety of polymers, especially polycarbonate. This technique has been utilized advantageously in several areas such as glazing applications. Although the application of a hard coating on the surface of a polymer provides in some instances improved abrasion resistance, the application of the hard-coat introduces additional process steps and tends to increase the processing time and cost. In addition, once a hard-coat is in contact with the surface (for example, the surface of a polycarbonate film), post-processing options are limited due to the presence of the hard-coat. Additional limitations are encountered as articles comprising a hard-coated polymer "weather" and the hard-coat erodes from the polymer surface, and the polymer once again becomes susceptible to scratching and marring. Additionally, hard-coats adhering to a polymer surface may delaminate.

Therefore, enhancement of the abrasion resistance of the parent thermoplastic polymers, especially that of parent PC and SLX polymers, represents a highly desirable objective. Moreover, plastic articles derived from these thermoplastic polymers having improved abrasion properties are also desired.

BRIEF DESCRIPTION

In one embodiment, the present invention provides a method for improving the abrasion resistance of a plastic article. The method comprises: (a) providing a composition comprising at least one e-beam active nanoparticle and at least one thermoplastic polymeric material; (b) forming an article from the composition of step (a); and (c) exposing the article formed in step (b) to an electron beam source.

In a second embodiment, the invention provides a method for improving the abrasion resistance of a plastic article comprising at least one thermoplastic polymeric material selected from the group consisting of a polycarbonate, a co-polycarbonate and a co-polyestercarbonate. The method comprises: (a) providing a composition comprising at least one e-beam active nanoparticle and at least one thermoplastic polymeric material selected from the group consisting of polycarbonates, co-polycarbonates, and co-polyestercarbonates; (b) forming an article from the composition of step (a); and (c) exposing the article formed in step (b) to an electron beam (e-beam) source.

In one embodiment, the invention provides a plastic article comprising an abrasion resistant surface; wherein said article is prepared by a method comprising: (a) providing a composition comprising at least one e-beam active nanoparticle and at least one thermoplastic polymeric material selected from the group consisting of polycarbonates, co-polycarbonates, and co-polyestercarbonates; (b) forming an article from the composition of step (a); and (c) exposing the article formed in step (b) to an electron beam source.

DETAILED DESCRIPTION

In the following specification and the claims which follow, reference will be made to a number of terms which shall be defined to have the following meanings.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about", are not to be limited to the precise value specified. In some instances, the approximating language may correspond to the precision of an instrument for measuring the value.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC($CF_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4- phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis(phenyl), and the like. The term "a C$_3$-C$_{10}$ aromatic radical" includes aromatic radicals containing at least three but no more than 10 carbon atoms. The aromatic radical 1-imidazolyl (C$_3$H$_2$N$_2$—) represents a C$_3$ aromatic radical. The benzyl radical (C$_7$H$_7$—) represents a C$_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C$_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C$_6$ cycloaliphatic radical comprising a methyl group, the methyl group being a functional group which is an alkyl group. Similarly, the 2-nitrocyclobut-1-yl radical is a C$_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$—), and the like. Further examples of cycloaliphatic radicals include 4-allyloxycyclohex-1-yl, 4-aminocyclohex-1-yl (i.e., H$_2$NC$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis(cyclohexyl), and the like. The term "a C$_3$-C$_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH2)$_9$—) is an example of a C$_{10}$ aliphatic radical.

As used herein, the term "abrasion resistance" refers to the resistance of a material to remain unimpaired by mechanical action, such as rubbing, scraping or erosion; impact; or pressure. The abrasion may result in loss in weight or a loss in gloss of the surface. The term abrasion resistance encompasses mar resistance and scratch resistance.

As noted, in one aspect the present invention provides a method for improving the abrasion resistance of a plastic article. The method comprises: (a) providing a composition comprising at least one e-beam active nanoparticle and at least one thermoplastic polymeric material; (b) forming an article from the composition of step (a); and (c) exposing the article formed in step (b) to an electron beam source.

As used herein, the term "e-beam active nanoparticle" refers to a nano-sized particle capable of cross-linking to itself or another organic moiety upon exposure to an electron beam (e-beam) source. Without being bound by any theory, it is believed that the e-beam active nanoparticle may generate stable free radicals upon exposure to an electron beam source. The e-beam active nanoparticle may act as a cross-linking promoter and may cross-link to the thermoplastic polymeric material on exposure to an electron beam source.

The e-beam active nanoparticle may be used as cross-linking promoter for any thermoplastic polymeric material known to one of ordinary skill in the art. As used herein, the term "thermoplastic polymeric material" refers to a material with a macromolecular structure that will repeatedly soften when heated and harden when cooled. Illustrative examples of thermoplastic polymeric materials suitable for the method of the present invention include, but are not limited to, olefin-derived polymers, for example, polyethylene, polypropylene, and their copolymers; polymethylpentane-derived polymers, for example, polybutadiene, polyisoprene, and their copolymers; polymers of unsaturated carboxylic acids and their functional derivatives, for example, acrylic polymers such as poly (alkyl acrylates), poly (alkyl methacrylate), polyacrylamides, polyacrylonitrile, and polyacrylic acid; alkenylaromatic polymers, for example polystyrene, poly-alpha-methylstyrene, polyvinyltoluene, and rubber-modified polystyrenes; polyamides, for example, nylon-6, nylon-6,6, nylon-1,1, and nylon-1,2; polyesters, such as, poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly (cyclohexanedimethanol terephthalate), poly (cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and poly(alkylene arenedioates); polycarbonates; co-polycarbonates; co-polyestercarbonates; polysulfones; polyimides; polyarylene sulfides; polysulfide sulfones; and polyethers such as polyarylene ethers, polyphenylene ethers, polyethersulfones, polyetherimides, polyetherketones, polyetheretherketones; and copolymers thereof.

In one embodiment, the thermoplastic polymeric material is selected from the group consisting of polyesters such as PETs, PBTs, polysulfones, polyethersulfones, polyimides, polyetherimides, polyetherketones, polyetheretherketones, polyphenylene ethers, polycarbonates, co-polycarbonates, co-polyestercarbonates, and copolymers thereof. In an alternate embodiment, the thermoplastic polymer is selected from the group consisting of polycarbonates, co-polycarbonates, and co-polyestercarbonates.

Thus, in one embodiment, the present invention provides a method for improving the abrasion resistance of a plastic article comprising at least one of a polycarbonate, a co-polycarbonate, or a co-polyestercarbonate. The method comprises: (a) providing a composition comprising at least one e-beam active nanoparticle and at least one thermoplastic polymeric material selected from the group consisting of polycarbonates, co-polycarbonates, and co-polyestercarbonates; (b) forming an article from the composition of step (a); and (c) exposing the article formed in step (b) to an electron beam source.

The e-beam active nanoparticle comprises a nano-sized particle capable of cross-linking to itself or another organic moiety on exposure to an electron beam source. The nano-sized particle or nanoparticle may be itself capable of cross-linking on exposure to an electron beam source or may be surface modified with functional groups capable of cross-linking on exposure to an electron beam source. The e-beam active nanoparticle may comprise organic or inorganic nanoparticles.

In one embodiment, the e-beam active nanoparticle comprises at least one inorganic nanoparticle surface-modified with at least one e-beam active functional group.

In one embodiment, the inorganic nanoparticle comprises a metallic component selected from the group consisting of metal oxides, metal nitrides, zero valent metals, mixed metals, mixed metal oxide, mixed metal nitrides, metal oxynitrides, mixed metal oxynitrides, and combinations of two or more of the foregoing. In another embodiment, the inorganic nanoparticle comprises a component selected from the group consisting of silicon oxide, aluminum oxide, aluminum silicon oxide, aluminum nitride, boron nitride, antimony oxide, iron oxide, magnesium oxide, zinc oxide, zirconium oxide, titanium oxide, chromium oxide, and mixtures of two or more of the foregoing metal oxides.

The e-beam active functional group is capable of forming cross-links on exposure to an electron beam source. In one embodiment, the e-beam active functional group is attached to an inorganic nanoparticle by the surface modification of the inorganic nanoparticle with an organic functionalizing agent comprising at least one e-beam active functional group. Suitable organic functionalizing agents include organo-silanes, organo-titanates, organo-zirconates, betadiketones, carboxylic acids (e.g. citric acid), carboxylic acid salts (e.g. sodium citrate), thiols, and amines, comprising at least one e-beam active functional group. The e-beam active functional groups are typically aliphatic radicals, especially secondary and tertiary aliphatic radicals, or aromatic radicals, especially benzyl radicals. In one embodiment, the e-beam active functional group comprises at least one organo-siloxane. In another embodiment, the e-beam active nanoparticle comprising an e-beam active functional group is prepared by contacting an inorganic nanoparticle with an organo-silane. As used herein the term "silane" includes both organo-silanes and inorganic silanes (e.g. $SiH_4$), and inorganic polysilanes (e.g. $H_3SiSiH_3$).

The e-beam active nanoparticle comprising inorganic nanoparticles surface-modified with an e-beam active functional group may be produced by any method known to those skilled in the art. In one embodiment, said e-beam active nanoparticle is formed by contacting at least one inorganic nanoparticle with at least one silane having formula (I);

$$R^1_a SiX_b \tag{I}$$

wherein "a" and "b" are independently at each occurrence an integer from 1 to 3, with the proviso that "a+b"=4; $R^1$ is independently at each occurrence a $C_1$-$C_{20}$ aliphatic radical, a $C_3$-$C_{40}$ cycloaliphatic radical, a $C_3$-$C_{40}$ aromatic radical or an organosiloxane moiety; and X is a halogen, a $C_1$-$C_{10}$ alkoxy radical, or a $NHSiR^2_3$ group, where $R^2$ is independently at each occurrence a $C_1$-$C_{20}$ aliphatic radical, a $C_3$-$C_{40}$ cycloaliphatic radical, or a $C_3$-$C_{40}$ aromatic radical. In one embodiment, $R^1$ of formula (I) comprises a functional group cabale of generating stable free radical on exposure to an electron beam source.

In one embodiment, the e-beam active nanoparticle is produced by a contacting an inorganic particle comprising hydroxyl groups on the surface and at least one silane having formula (I). In another embodiment, the e-beam active nanoparticle is produced by contacting an inorganic particle comprising hydroxyl groups on the surface and different silanes having different structures. The e-beam active nanoparticle in this case may be produced by first contacting the inorganic nanoparticle to a first silane followed by other silanes or by contacting the inorganic nanoparticle with the different silanes simultaneously.

In one embodiment, the e-beam active nanoparticle is produced by a condensation reaction of an inorganic particle comprising hydroxyl groups on the surface and at least one silane having formula (I). The condensation reaction may result in surface functionalization of the inorganic particle due to the formation of SiO— bonds. In one embodiment, the e-beam active nanoparticle comprises a silane moiety bound through a single SiO— bond to an inorganic nanoparticle; In another embodiment, the e-beam active nanoparticle comprises a silane moiety bound through more than one SiO— bonds to an inorganic nanoparticle. In yet another embodiment, the e-beam active nanoparticle comprises at least two different silanes.

In one embodiment, said e-beam active nanoparticle is formed by contacting at least one inorganic nanoparticle selected from the group consisting of silicon oxide, aluminum oxide and aluminum silicon oxide with a silane having formula (I).

In one embodiment, said silane having formula (I) is selected from the group consisting of trihalo silanes, trialkoxy silanes, and disilazanes. In another embodiment, said silane is selected from the group consisting of trialkoxysilanes and disilazanes. Trialkoxysilanes exemplifying some embodiments of the present invention include, but are not limited to, trimethoxysilanes, allyltrimethoxysilanes, phenyltrimethoxysilanes, benzyltrimethoxysilanes, triethoxysilanes, allyltriethoxysilanes, phenyltriethoxysilanes, and benzyltriethoxysilanes. Disilazanes exemplifying some embodiments of the present invention include, but are not limited to, hexamethyldisilazane and hexaethyldisilazane.

In one embodiment, the e-beam active nanoparticle comprises organic or inorganic nanoparticles capable of forming cross-links on exposure to an electron bema source. In one embodiment, the e-beam active nanoparticle comprises organic nanoparticles selected from the group consisting of adamantane, cubane, and their substituted analogues. Typically, the substituted analogues of adamantane and cubane comprise primary, secondary, tertiary aliphatic radicals. In one embodiment, the substituted analogues of adamantane and cubane comprise benzyl groups. Without being bound by any theory, it is believed that the secondary, tertiary or benzyl organic radicals serve as precursors to relatively stable free radicals which are formed from said precursors upon exposure to an electron beam (e-beam) source, and subsequently these radicals promote further chemistry improving the scratch and mar resistance of a plastic material comprising said e-beam active nano-particles. Substituted analogues of adamantane are exemplified by 1-methyladamantane, 1-benzyladamantane, 2-benzyladamantane, 1-cyclopropyladamantane, and the like. Substituted analogues of cubanes are exemplified by 1-methylcubane, 1-benzylcubane, 1-isopropylcubane, 1-cyclopropylcubane, and the like. Substituted analogues of adamantane are defined herein to derivatives of adamantane. Similarly, substituted analogues of cubane are defined herein to derivatives of cubane.

In one embodiment, the e-beam active nanoparticle has a particle size in the range from about 0.5 nm to about 500 nm. In another embodiment, the e-beam active nanoparticle has a particle size in the range from about 2 nm to about 250 nm. In yet another embodiment, the e-beam active nanoparticle has a particle size in the range from about 5 nm to about 100 nm. Here and throughout the specification and claims, range limitations may be combined and/or interchanged. Such ranges as identified include all the sub-ranges contained therein unless context or language indicates otherwise.

The miscibility of e-beam active nanoparticle and its efficiency as a cross-link promoter may be determined by the total concentration of the e-beam active nanoparticle in the composition. In one embodiment, the e-beam active nanoparticle is present in an amount corresponding to from about 0.1 weight percent to about 50 weight percent of the thermoplastic polymer. In another embodiment, the e-beam active nanoparticle is present in an amount corresponding to from about 1 weight percent to about 25 weight percent of the polymer. In yet another embodiment, the e-beam active nanoparticle is present in an amount corresponding to from about 2.5 weight percent to about 10 weight percent of the polymer.

Introduction of e-beam active nanoparticles as cross-linking promoters with thermoplastic plastic polymeric materials may provide many advantages. The e-beam active nanoparticle may provide covalent-bond formation between a particle and a polymer upon e-beam irradiation only at a selected stage of polymer processing. The e-beam active nanoparticles may comprise thermally stable functional groups, and thus these particles may be mixed with the thermoplastic polymer and processed at high temperatures without compromising the processablity of the polymer. The e-beam active nanoparticles may be non-volatile, and may reduce the risk of contaminating the processing line due to the vaporization of these nanoparticles that may occur for small molecule organic compounds. The e-beam active nanoparticles may provide synergistic properties improvements in addition to the cross-linking (chemical bonding). The synergistic property improvement may include hardness, modulus, temperature stability, low friction coefficient, chemical resistance, low coefficient of thermal expansion, or low dielectric constant. The e-beam nanoparticle may have particle sizes smaller than the wavelength of visual lights and the compositions comprising an e-beam active nanoparticle and a thermoplastic polymer may have clear appearance.

In one embodiment, the thermoplastic polymeric material comprises a polycarbonate comprising structural units having formula (II);

wherein $R^3$ is a divalent $C_2$-$C_{20}$ aliphatic radical, a divalent $C_3$-$C_{40}$ aromatic radical, or a divalent $C_3$-$C_{40}$ cycloaliphatic radical. In some embodiments, $R^3$ may be derived from a dihydroxy aliphatic compound, a dihydroxy cycloaliphatic compound or a dihydroxy aromatic compound.

In one embodiment, $R^3$ is a divalent $C_3$-$C_{40}$ aromatic radical derived from a dihydroxy aromatic compound having formula (III);

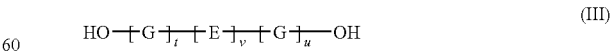

wherein each G is independently at each occurrence a $C_3$-$C_{40}$ aromatic radical; E is independently at each occurrence a bond, a $C_1$-$C_{20}$ aliphatic radical, a $C_3$-$C_{40}$ cycloaliphatic radical, a $C_3$-$C_{40}$ aromatic radical, a sulfur-containing linkage, a selenium-containing linkage, a phosphorus-containing linkage, or an oxygen atom; "t" is a number greater than or equal to one; "v" is either zero or one; and "u" is a whole number including zero.

In certain embodiments, the dihydroxy aromatic compound is selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 2,2-bis(4-hydroxyphenyl-1,1,1,3,3,3-hexafluoropropane); 1,1-bis(4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbornane; 9,9-bis(4-hydroxyphenyl)fluorene; 3,3-bis(4-hydroxyphenyl)phthalide; 1,2-bis(4-hydroxyphenyl)ethane; 1,3-bis(4-hydroxyphenyl)propenone; bis(4-hydroxyphenyl)sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl)acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,5',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methyl-ethyl)-1,3-cyclohexandiyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a,10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol;

4,4'-bis(3,5-dimethyl)diphenol; 4,4'-dihydroxydiphenylether; 4,4'-dihydroxydiphenylthioether;1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; resorcinol; $C_{1-3}$ alkyl-substituted resorcinols; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; and mixtures thereof. Dihydroxy aromatic compounds of formula (XVI) are commercially available or may be prepared by methods known to those skilled in the art.

In one embodiment, the dihydroxy aromatic compound is a bisphenol having formula (IV):

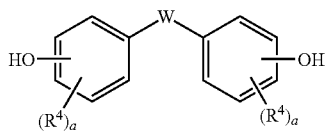

(IV)

wherein $R^4$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; "a" is independently at each occurrence an integer from 0 to 4; and W is a $C_1$-$C_{20}$ aliphatic radical, a $C_3$-$C_{40}$ cycloaliphatic radical, or a $C_3$-$C_{40}$ aromatic radical.

In one embodiment, $R^3$ of formula (II) is derived from bisphenol A (2,2-bis(4-hydroxyphenyl)propane, CAS No. 80-05-7) and the thermoplastic polymeric material is a Bisphenol A polycarbonate. Bisphenol A is available commercially from ALDRICH Chemical Co. Bisphenol A polycarbonate falls within generic formula (II) and represents the case wherein $R^3$ is derived from a bisphenol having formula (IV), wherein "a" in formula (IV) is equal to 0, W is an isopropylidene radical, and the hydroxyl groups are present at the 4,4' positions.

In another embodiment, $R^3$ of formula (II) is derived from bisphenol Z (4,4'-cyclohexylidenebisphenol, CAS No. 843-55-0) and the thermoplastic polymeric material is a Bisphenol Z polycarbonate. Bisphenol Z is available commercially from ALDRICH Chemical Co. Bisphenol Z polycarbonate falls within generic formula (II) and represents the case wherein $R^{16}$ is derived from a bisphenol having formula (IV), wherein "a" in formula (IV) is 0, W is a cyclohexylidene radical, and the hydroxyl groups are present at the 4,4' positions.

Examples of other polycarbonates which may be suitable for the method of the present invention include, but are not limited to, 2,2'-dimethylbisphenol Z polycarbonate, 2,2' dimethylbisphenol A polycarbonate, and bisphenol M polycarbonate.

Many suitable polycarbonates are commercially available and many others may be prepared by methods known in the art. Methods for preparation of polycarbonates include, but are not limited to, interfacial polymerization using for example phosgene; bischloroformate polymerization method using for example bisphenol A bischloroformate; and melt polymerization method using for example bisphenol A and a diaryl carbonate, such as diphenyl carbonate.

In one embodiment, the polycarbonate is a homopolymer i.e., containing structural units derived from the same dihydroxy compound. In one embodiment, the thermoplastic polymeric material comprises a co-polycarbonate i.e., comprises structural units derived from two or more of the dihydroxy compounds. In one embodiment, the co-polycarbonate comprises structural units derived from one or more of the dihydroxy aromatic compounds represented by formula (III). In one embodiment, the thermoplastic polymeric material comprises a co-polycarbonate comprising structural units having formula (V):

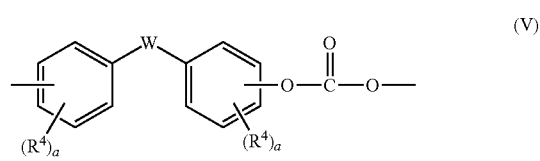

(V)

wherein $R^4$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; "a" is independently at each occurrence an integer from 0 to 4; and W is a $C_1$-$C_{20}$ aliphatic radical, a $C_3$-$C_{40}$ cycloaliphatic radical, or a $C_3$-$C_{40}$ aromatic radical. Those skilled in the art will understand that the term "co-polycarbonates comprising structural units (V)" refers to co-polycarbonates comprising the structural units shown in structure (V), and that the term is not intended to suggest that the co-polycarbonate comprises "repeat units" having structure (V).

In one embodiment, the thermoplastic polymeric material comprises a co-polycarbonate comprising bisphenol A polycarbonate structural units. In one embodiment, the thermoplastic polymeric material comprises a co-polycarbonate comprising bisphenol Z polycarbonate structural units. Both bisphenol A polycarbonate structural units and Bisphenol Z polycarbonate structural units fall within the ambit of structural units represented by formula (V).

Many suitable co-polycarbonates are commercially available and many others may be prepared by methods known in the art. Methods for preparation of structural units of co-polycarbonates may be similar to preparation of polycarbonates and may include, but are not limited to, interfacial polymerization using for example phosgene; bischloroformate polymerization method using for example bisphenol A bischloroformate; and melt polymerization method using for example bisphenol A and a diaryl carbonate, such as diphenyl carbonate In one embodiment, the thermoplastic polymeric material comprises a co-polyestercarbonate comprising at least one polycarbonate block and at least one polyester block. In another embodiment, the thermoplastic polymeric material comprises a co-polyestercarbonate comprising a polyester block comprising structural units having formula (VI):

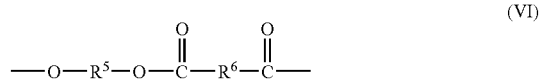

(VI)

wherein $R^5$ is independently at each occurrence a divalent $C_2$-$C_{20}$ aliphatic radical, a divalent $C_3$-$C_{40}$ aromatic radical, or a divalent $C_3$-$C_{40}$ cycloaliphatic radical; and $R^6$ is independently at each occurrence a divalent $C_1$-$C_{20}$ aliphatic radical, a divalent $C_3$-$C_{40}$ aromatic radical, or a divalent $C_3$-$C_{40}$ cycloaliphatic radical. The structural units of formula (VI) may be derived from a diol of formula (VII) and diacid or diacid derivatives of formula (VIII).

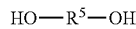
(VII)

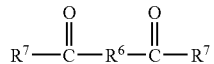
(VIII)

wherein $R^5$ is a divalent $C_2$-$C_{20}$ aliphatic radical, a divalent $C_3$-$C_{40}$ aromatic radical, or a divalent $C_3$-$C_{40}$ cycloaliphatic radical; $R^6$ is a divalent $C_1$-$C_{20}$ aliphatic radical, a divalent $C_3$-$C_{40}$ aromatic radical, or a divalent $C_3$-$C_{40}$ cycloaliphatic radical; and $R^7$ is independently at each occurrence a hydroxyl, a halogen, a $C_1$-$C_{20}$ alkoxy group, or a $C_3$-$C_{20}$ aryloxy group.

Suitable diacids and diacid derivatives, for example diacids, diacid halides, diesters and acid esters, encompassed within formula (VIII) include, but are not limited to decanedioic acid, undecanedioic acid, dodecanedioic acid, sebacic acid, adipic acid, suberic acid, oleic acid, azelaic acid, erucaic acid, brazzylic acid, isophthalic acid, terephthalic acid, malonic acid, malic acid, maleic acid, lactic acid, naphthalene-2,6-dicarboxylic acid, naphthalene-2,7-dicarboxylic acid, cyclohexane-1,4-dicarboxylic acid, biphenyl-3,4'-dicarboxylic acid biphenyl-4,4'-dicarboxylic acid, diphenylether-4,4'-dicarboxylic acid, diphenylsulfone-4,4'-dicarboxylic acid, diphenylketone-4,4'-dicarboxylic acid, diphenylsulfide-4,4'-dicarboxylic acid, diphenylmethane-4,4'-dicarboxylic acid, diphenyldichloromethane-4,4'-dicarboxylic acid, their corresponding diacid halides, diesters or acid esters and mixtures thereof.

The co-polyestercarbonates of the present invention and the methods for their preparation are well known in the art. In one embodiment, the co-polyestercarbonate comprises a polyester block comprising structural units represented by formula (VII), which are derived from aliphatic diols or aliphatic diacids or diacid derivatives. LEXAN SP is one example of such a co-polyestercarbonate incorporating structural units derived from bisphenol A and dodecanedioic acid. LEXAN SP is available commercially from GE Advanced Materials, Pittsfield, Mass. Examples of other suitable co-polyestercarbonates and methods which may be used for preparing said copolyestercarbonates for use according to the present invention are found, for example in U.S. Pat. Nos. 4,238,596 and 4,238,597.

In one embodiment, the co-polyestercarbonate comprises a polyester block comprising structural units derived from at least one dihydroxy aromatic compound and at least one aromatic dicarboxylic acid residue. In one particular embodiment, the dihydroxy aromatic compound is derived from a 1,3-dihydroxybenzene having formula (IX), commonly referred to as resorcinol or a resorcinol derivative.

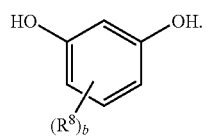
(IX)

In formula (IX), "b" is independently at each occurrence an integer from 0 to 4 and $R^8$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical. Resorcinol or resorcinol derivative as used within the context of the present invention should be understood to include both unsubstituted 1,3-dihydroxybenzene and substituted 1,3-dihydroxybenzenes unless explicitly stated otherwise.

Suitable aromatic dicarboxylic acid residues include aromatic dicarboxylic acid residues derived from monocyclic aromatic diacid compounds, including isophthalic acid, terephthalic acid, or mixtures of isophthalic and terephthalic acids, or from polycyclic aromatic diacid compounds. In various embodiments the aromatic dicarboxylic acid residues may be represented by formula (X).

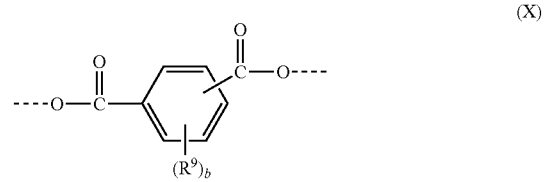
(X)

In formula (X), "b" is independently at each occurrence an integer from 0 to 4 and $R^9$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical. The aromatic dicarboxylic acid residues are typically derived from the corresponding acids, acid halides and esters. In one embodiment, the aromatic dicarboxylic acid residues are derived from a mixture of isophthaloyl chloride ($C_8H_4O_2Cl_2$) and terephthaloyl chloride ($C_8H_4O_2Cl_2$).

For convenience, polyesters comprising structural units derived from resorcinol or a resorcinol derivative (IX) and iso- and terephthalte and residues (X) are referred to as "ITR polymers", or simply "ITR's". Therefore, in one particular embodiment, the thermoplastic polymeric material comprises co-polyestercarbonates comprising ITR structural units of formula (XI);

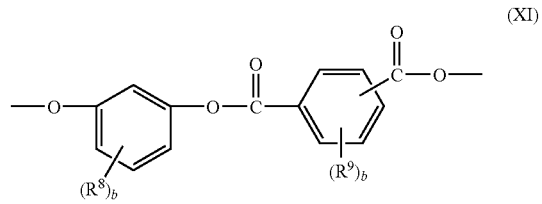
(XI)

wherein $R^8$ and $R^9$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and "b" is independently at each occurrence an integer from 0 to 4.

In one embodiment, the copolyestercarbonate comprises polyester blocks and polycarbonate blocks. The co-polyestercarbonates are typically prepared by reacting a hydroxy-terminated polyester intermediate (for example a hydroxy-terminated ITR intermediate) with a dihydroxy-substituted aromatic compound (e.g. a bisphenol such as bisphenol A) and phosgene under interfacial conditions. The hydroxy-terminated polyester intermediate can be prepared by methods known to those skilled in the art.

In one embodiment, the hydroxy-terminated polyester intermediate is prepared by reacting a dihydroxy aromatic compound such as resorcinol with one or more aromatic diacid chlorides (e.g. isophthaloyl dichloride and terephthaloyl dichloride) in a reaction mixture comprising water and at least one organic solvent substantially immiscible with water (i.e. under interfacial conditions). Control of the molecular weight of the hydroxy-terminated polyester may be exerted by increasing the molar ratio of the dihydroxy-substituted aromatic compound to the diacid chloride employed, and by decreasing the amount of water present in the reaction mixture. Enhanced control of the molecular weight of the hydroxy-terminated polyester intermediate may thus be achieved with or without the use of an endcapping agent.

The composition comprising at least one e-beam active nanoparticle and at least one thermoplastic polymeric material may additionally contain additives known to those skilled in the art, including pigments, dyes, impact modifiers, UV screeners, flame retardants, fillers, stabilizers, flow aids, ester interchange inhibitors, and mold release agents The compositions of the present invention may be prepared or provided by mixing or blending an appropriate amount of an e-beam active nanoparticle with a thermoplastic polymeric material with any other additives. Methods of mixing or blending include, but are not limited to, melt mixing in a single screw or twin-screw extruder, mixing the components of the blend and composition as powders on a two-roll mill, in a Banbury mixer, in a paint shaker or in a coffee grinder.

In some embodiments, one or more components or additives can be added to the composition as an aqueous mixture or solution followed by devolatilization in appropriate processing equipment such as in an extruder. In another embodiment, some of the components may be mixed in aqueous solution and then evaporated to form a material which can be added to the remaining components In one embodiment, after blending, the composition may optionally be then reduced to a particulate form for example by pelletizing or grinding the composition. In one embodiment, the compositions of the present invention may be molded into useful shaped articles by a variety of means such as injection molding, extrusion, rotational molding, blow molding and thermoforming to form articles such as films or multilayered structures.

In one embodiment, the composition comprising at least one e-beam active nanoparticle and at least thermoplastic polymeric material is extruded to form an article, which is a film. In one embodiment, the film has a thickness in a range from about 10 microns to about 1000 microns. In another embodiment, the film has a thickness in a range from about 100 microns to about 800 microns. In yet another embodiment, the film has a thickness in a range from about 200 microns to about 600 microns.

In one embodiment, a multilayer article is formed from the composition comprising at least one e-beam active nanoparticle and at least one thermoplastic polymeric material. The multilayer article comprises a substrate layer and a coating layer thereon. The substrate layer comprises a thermoplastic polymer, a thermoset polymer, cellulosic material, glass, ceramic, or metal. The coating layer comprises at least one e-beam active nanoparticle and least one thermoplastic polymeric material selected from the group consisting of polycarbonates, co-polycarbonates, and co-polyestercarbonates. Optionally, the multilayer articles may further comprise an interlayer, for example an adhesive interlayer, between any substrate layer and any coating layer. Multilayer articles of the invention include, but are not limited to, those which comprise a substrate layer and a coating layer; those which comprise a substrate layer with a coating layer on each side of said substrate layer; and those which comprise a substrate layer and at least one coating layer with at least one interlayer between a substrate layer and a coating layer. The interlayer layer may be transparent and/or may contain an additive, for example a colorant or decorative material such as metal flake. The substrate layer, the coating layer, and any interlayers are preferably in contiguous superposed contact with one another.

The material of the substrate layer in the articles of this invention may be at least one second polymeric material, whether addition or condensation prepared. Suitable condensation polymers include, but are not limited to, polycarbonates, particularly aromatic polycarbonates, polyphenylene ethers, polyetherimides, polyesters, co-polyestercarbonates, and polyamides. In one embodiment, the substrate layer comprises at least one second polymeric material selected from the group consisting of polycarbonates, co-polycarbonates and co-polyestercarbonates. The second polymeric material is different from the thermoplastic polymeric material of the composition comprising an e-beam active nanoparticle and a thermoplastic polymeric material.

Suitable polycarbonates (PC) and co-polycarbonates include structural units of formula (XVIII). The most preferred polycarbonates are bisphenol A homo- and co-polycarbonates. The polycarbonate substrate may also be a co-polyestercarbonate (other than that co-polyestercarbonate employed for the coating layer). Such copolymers typically comprise, in addition to the organic carbonate units, ester units such as isophthalate and/or terephthalate and may comprise structural units of formula (XIX). Polyester substrates include, but are not limited to, poly(ethylene terephthalate) (PET), poly(1,4-butylene terephthalate) (PBT), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly(vinyl fluoride), poly(vinylidene fluoride), poly(vinyl acetate), poly (vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, polymethyl methacrylate/acrylic rubber, polyphenylene ether/polystyrene, polyphenylene ether/polyamide or polyphenylene ether/polyester.

In one embodiment, the substrate layer in the multilayer article may comprise at least one of a thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, ureaformaldehyde, benzocyclobutanes, hydroxymethylfurans, and isocyanates. In one embodiment, the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment, a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In one embodiment, the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

In one embodiment, the multilayer article comprises at least one glass layer as substrate layer. In one embodiment, the multilayer article comprises at least one metal layer as substrate layer. Representative metal substrates include those comprising brass, copper, and other metals or metal-containing articles, which might abrade.

Depending upon the nature of substrate and coating layers, at least one adhesive interlayer may be beneficially employed between any substrate layer and any coating layer. The adhesive interlayer may be transparent, opaque or translucent. For many applications it is preferred that the interlayer be optically transparent in nature and generally have a transmission of greater than about 60% and a haze value less than about 3% with no objectionable color.

In one embodiment, application of said coating layer comprises fabrication of a separate sheet thereof followed by application to the substrate layer, or by simultaneous production of both layers, typically in a melt process. Thus, there may be employed such methods as co-injection molding, coextrusion, overmolding, blow molding, multi-shot injection molding and placement of a film of the coating layer material on the surface of the substrate layer followed by adhesion of the two layers, typically in an injection molding apparatus; e.g., in-mold decoration, or in a hot-press. In one embodiment, application of the at least one coating layer may be performed by solvent-casting.

It is also within the scope of the invention to apply a structure comprising the coating layer and the substrate layer to a second substrate layer, which is generally of a thermoplastic, thermoset, or cellulosic material similar or identical to that of the substrate layer but different from that of the coating layer. This may be achieved, for example, by charging an injection mold with the structure comprising the coating layer and the substrate layer and injecting the second substrate material behind it. By this method, in-mold decoration and the like are possible. Both sides of the second substrate layer may receive the other layers, though it is usually preferred to apply them to only one side.

In one embodiment, the coating layer comprising the composition comprising an e-beam active nanoparticle and a thermoplastic polymeric material has a thickness in a range from about 10 microns to about 1000 microns. In another embodiment, the coating layer comprising the composition comprising an e-beam active nanoparticle and a thermoplastic polymeric material has a thickness in a range from about 100 microns to about 800 microns. In yet another embodiment, the coating layer comprising the composition comprising an e-beam active nanoparticle and a thermoplastic polymeric material has a thickness in a range from about 200 microns to about 600 microns.

In one embodiment, the substrate layer comprising the second polymeric material has a thickness in a range from about 10 microns to about 2000 microns. In another embodiment, the substrate layer comprising the second polymeric material has a thickness in a range from about 200 microns to about 1600 microns. In yet another embodiment, the substrate layer comprising the second polymeric material has a thickness in a range from about 400 microns to about 1000 microns.

As noted, an article comprising a composition comprising an e-beam active nanoparticle and a thermoplastic polymeric material is exposed to an electron beam (E-beam) source. Exposure to E-beam source introduces cross-links and/or chain scission and changes in polymer properties. The technique of exposure to E-beam source or E-beam irradiation is used in various applications such as television screens and is well-known to those of ordinary skill in the art. In one embodiment, E-beam irradiation comprises thermal emission of electrons from an electron emitting material such as tungsten; acceleration of the electrons emitted by application of voltage thereto; and focusing the beam by use of an electron field and/or transverse magnetic field. The E-beam irradiation may occur in ambient atmosphere conditions, in vacuum, or in an inert atmosphere. In one embodiment, the E-beam irradiation is conducted in the presence of nitrogen or hydrogen. In one embodiment, the E-beam irradiation is conducted in vacuum.

The acceleration voltage of the E-beam source determines the penetration depth of the E-beam. In one embodiment, the E-beam source has an operating voltage in the range from about 80 kV to about 20 MV. In another embodiment, the E-beam source has an operating voltage in the range from about 80 kV to about 1000 kV. In yet another embodiment, the E-beam source has an operating voltage in the range from about 80 kV to about 500 kV. In one particular embodiment, the electron beam source has an operating voltage of about 150 kV.

The change in properties of a plastic article upon exposure to E-beam radiation is determined by the E-bean dosage which is measured as energy per unit mass (e.g., 2.30 calories per gram equals one million rads, 1 Mrad). In one embodiment, exposure to an electron beam source results in an electron beam dosage in the range from about 1 Mrad to about 5000 Mrad. In another embodiment, exposure to an electron beam source results in an electron beam dosage in the range from about 1 Mrad to about 500 Mrad. In yet another embodiment, exposure to an electron beam source results in an electron beam dosage in the range from about 1 Mrad to about 200 Mrad.

In one embodiment, exposure to E-beam source results in change in one or more of glass transition temperatures, heat distortion temperatures, tensile strength/modulus, coefficient of thermal expansion, chemical resistance, or abrasion resistance.

In one embodiment, the present invention provides an article comprising an abrasion resistant surface. The article is prepared by a method comprising: (a) providing a composition comprising at least one e-beam active nanoparticle and at least one thermoplastic polymeric material selected from the group consisting of polycarbonates, co-polycarbonates, and copolyestercarbonates; (b) forming an article from the composition of step (a); and (c) exposing the article formed in step (b) to an electron beam source.

The articles which can be prepared by the method of the present invention include, automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

EXAMPLES

Materials: Polymer materials used in the experiments were ITR-polycarbonate copolymers (SLX90/10) with the weight fraction of ITR block to the polycarbonate block in the polymer equal to 90:10. Unless otherwise mentioned, the SLX90/10 polymers were end-capped with phenol and were commercially available from GE Plastics. Colloidal silica (20 nm, 34% aqueous solution) was obtained from Nalco Company. Alumina and aluminum silicon oxide (82.5% Al, 17.5% Si) powder were obtained from Nanoproducts Corporation. Silanes were obtained form Gelest, Inc. The nanoparticles and the silanes were used as received. Experimental details for synthesis for synthesis of e-beam active nanoparticles are provided in Examples 1-5. Hereinafter, untreated aluminum silicon oxide will be referred to as Untreated AlSiO.

Example 1

Surface Modification of Colloidal Silica with Phenyltriethoxysilane and Hexamethyldisilazane Colloidal silica (Nalco 1034A, 20 nm) (100 g) and isopropanol (195 ml) were placed in a 2 L three neck flask equipped with a condenser and a dropping funnel. Phenyltriethoxysilane (2.10 g, 8.74 mmol) was added dropwise to the mixture of colloidal silica and isopropanol. The mixture was refluxed at 80° C. for 3 h and cooled to room temperature. After cooling, 100 ml of the solvent (isopropanol) was removed under vacuum at 85° C. The reduced volume was compensated by adding methoxypropanol. A total of 500 ml of the solvents were removed by repeating the solvent replacement. Hexamethyldisilazane (5.07 g, 31.4 mmol) was then added dropwise to the mixture at room temperature. The resulting mixture was further refluxed for 1 h, cooled to room temperature, and filtered through a paper filter. The filtrate was collected and dried by removal of the solvent using a vacuum oven. Hereinafter surface modification of colloidal silica with phenyltriethoxysilane and hexamethyldisilazane will be referred to as Treatment 1.

Example 2

Surface Modification of Aluminum Silicon Oxide with allyltrimethoxysilane

Aluminum silicon oxide (Nanoproducts Corporation, Al3N3190 50 nm) (5 g), and toluene (150 ml) were placed in a 500 mL three neck flask equipped with a condenser and a dropping funnel. The resulting mixture was sonicated with an ultrasonic probe (Sonics vibracell, 90% amplitude 2 sec pulse/2 sec pause/under $N_2$) for 5 min at room temperature followed by addition of allyltrimethoxysilane (5 wt % toluene solution, 26.7 g, 8.25 mmol) dropwise. The resulting mixture was under $N_2$ for 24 h. After cooling to room temperature, a powder was collected by centrifugation (3 min at 3000 rpm). The powder was mixed with 50 ml of toluene and sonicated for 1 min and centrifuged for 3 min at 3000 rpm. The procedure was repeated twice. The resulting powder was dried at 75° C. under vacuum. Hereinafter surface modification of aluminum silicon oxide with allyltrimethoxysilane will be referred to as Treatment 2.

Example 3

Surface Modification of Aluminum Silicon Oxide with Trimethoxysilane

Aluminum silicon oxide (Nanoproducts Corporation, Al3N3190 50 nm) (5 g), and toluene (150 ml) were placed in a 500 mL three neck flask equipped with a condenser and a dropping funnel. The resulting mixture was sonicated with an ultrasonic probe (Sonics vibracell, 90% amplitude 2 sec pulse/2 sec pause/under $N_2$) for 5 min at room temperature followed by addition of trimethoxysilane (5 wt % toluene solution, 27.1 g, 8.25 mmol) dropwise. The resulting mixture was under $N_2$ for 24 h. After cooling to room temperature, a powder was collected by centrifugation (3 min at 3000 rpm). The powder was mixed with 50 ml of toluene and sonicated for 1 min and centrifuged for 3 min at 3000 rpm. The procedure was repeated twice. The resulting powder was dried at 75° C. under vacuum. Hereinafter surface modification of aluminum silicon oxide with trimethoxysilane will be referred to as Treatment 3.

Example 4

Surface Modification of Aluminum Silicon Oxide with Benzyltriethoxysilane

Aluminum silicon oxide (Nanoproducts Corporation, Al3N3190 50 nm) (5 g), and toluene (150 ml) were placed in a 500 mL three neck flask equipped with a condenser and a dropping funnel. The resulting mixture was sonicated with an ultrasonic probe (Sonics vibracell, 90% amplitude 2 sec pulse/2 sec pause/under $N_2$) for 5 min at room temperature followed by addition of benzyltriethoxysilane (5 wt % toluene solution, 41.9 g, 8.25 mmol) dropwise. The resulting mixture was under $N_2$ for 24 h. After cooling to room temperature, a powder was collected by centrifugation (3 min at 3000 rpm). The powder was mixed with 50 ml of toluene and sonicated for 1 min. and centrifuged for 3 min at 3000 rpm. The procedure was repeated twice. The resulting powder was dried at 75° C. under vacuum. Hereinafter surface modification of aluminum silicon oxide with benzyltriethoxysilane will be referred to as Treatment 4.

Example 5

Surface Modification of Aluminum Silicon Oxide with Hexamethyldisilazane

Aluminum silicon oxide (Nanoproducts Corporation, Al3N31910 50 nm) (5 g), and toluene (150 ml) were placed in a 500 mL three neck flask equipped with a condenser and a dropping funnel. The resulting mixture was sonicated with an ultrasonic probe (Sonics vibracell, 90% amplitude 2 sec pulse/2 sec pause/under $N_2$) for 5 min at room temperature followed by addition of hexamethyldisilazane (5 wt % toluene solution, 26.6 g, 8.25 mmol) dropwise. The resulting mixture was under $N_2$ for 24 h. After cooling to room temperature, a powder was collected by centrifugation (3 min at 3000 rpm). The powder was mixed with 50 ml of toluene and sonicated for 1 min and centrifuged for 3 min at 3000 rpm. The procedure was repeated twice. The resulting powder was dried at 75° C. under vacuum. Hereinafter surface modification of aluminum silicon oxide with hexamethyldisilazane will be referred to as Treatment 4.

Examples 6-16 and Comparative Examples 1-3

Film formation: The polymer (SLX90/10) and the nanoparticles (Untreated AlSiO, nanoparticles synthesized in Examples 1-5, and adamantane) were dry blended using a coffee grinder and were extruded into 1-3 cm wide, 25-75 μm thick films at 285° C. using a vertical twin screw microcompunder (DACA) at 180-300 rpm. The obtained films were laminated to $10\times10\times0.5$ cm$^3$ BPA-PC plaques containing carbon blacks at 160-170° C. Concentrations of the e-beam active nanoparticles and TAIC varied in the range from about 1 weight percent to about 10 weight percent.

E-beam irradiation: For e-beam irradiation experiments, equipment with 80-150 kV operating voltage at Advanced Electron Beams Inc. in Wilmington Mass. was used. 125 kV was used as a standard unless otherwise noted. The unit was capable of giving a 5 Mrad dose with each pass. Dosages higher than that were obtained by using multiple passes. E-beam dosages were changed from 0 to 400 Mrad. All the experiments were done under a nitrogen blanket with oxygen concentration of less than 300 ppm unless otherwise noted.

Mar performance measurements: Mar performance of the samples were studied using an Altas Crockmeter with 2 micron polishing paper (3M 281Q WETORDRY PRODUCTION™ Polishing Paper 2MIC) with a felt (Atlas 14995600) sandwiched in between. Mar severity was controlled by the numbers of cycles with a half, two or ten cycles used. A cycle strokes back and forth, and "half" means going one direction once. The following method was used for the evaluation of mar performance: (1) Marred samples were visually compared to the standard samples under "Daylight 65" condition of "GretagMacbeth Spectralight III". The standard samples consist of polymers with different mar performances and they were marred with linen or paper with a different number of cycles to obtain different degree of mar damage severity (visual quality or VQ). They were put into 0 (worst) to 10 (best) scales visually. From each test, four duplicates were made for each condition and the average and the standard deviation of these numbers were used for the evaluation.

Mar performance of the samples was determined for samples with different e-beam active nanoparticles at different concentrations (Examples 6-15). SLX90/10 polymer without any e-beam active nanoparticle and SLX90/10 with nanoparticle without any surface functionalization were used as comparative examples (Comparative Examples 1-3). The details of the compositions and the experimental conditions employed for Examples 6-16 and Comparative Examples 1-3 are tabulated in Table 1.

TABLE 1

| Example | Polymer | E-beam active nanoparticle treatment | Conc (wt %) | E-beam dosage (Mrad) | VQ |
|---|---|---|---|---|---|
| 1* | SLX90/10 | — | — | — | 3 |
| 2* | SLX90/10 | — | — | 200 | 3.5 |
| 3* | SLX90/10 | Untreated AlSiO | 5.0 | 200 | 3.5 |
| 6 | SLX90/10 | Treatment 2 | 5.0 | — | 3.5 |
| 7 | SLX90/10 | Treatment 2 | 5.0 | 200 | 5 |
| 8 | SLX90/10 | Treatment 3 | 5.0 | — | 3.5 |
| 9 | SLX90/10 | Treatment 3 | 5.0 | 200 | 4 |
| 10 | SLX90/10 | Treatment 4 | 5.0 | — | 3.5 |
| 11 | SLX90/10 | Treatment 4 | 5.0 | 200 | 4.5 |
| 12 | SLX90/10 | Treatment 5 | 5.0 | — | 3.5 |
| 13 | SLX90/10 | Treatment 5 | 5.0 | 200 | 4 |
| 14 | SLX90/10 | Treatment 1 | 1.0 | — | 3 |
| 15 | SLX90/10 | Treatment 1 | 1.0 | 200 | 4.5 |
| 16 | SLX90/10 | Adamantane | 5.0 | 200 | 4.5 |

*Indicates Comparative Examples

The following comparisons are illustrative:

E-beam irradiation of SLX90/10 itself improved the mar resistance slightly and changed the VQ from 3 (Comparative Example 1) to 3.5 (Comparative Example 2). However, addition of plain aluminum silicon oxide without surface modification did not change the e-beam response and the mar performance (VQ) did not improve further (Comparative Example 3).

Similarly, addition of 5 wt % of AllylAlSiO without any electron beam irradiation (Example 6) did not change the VQ. Addition of 5 wt % of AllylAlSiO (Example 7) followed with 200 Mrad irradiation resulted in improvement in the mar performance as seen by the increase in VQ from 3.5 to 5 with. Similar trends were also observed for Examples 8-16. Addition of the e-beam active nanoparticle without any e-beam irradiation did not result in mar performance improvement (Examples 8, 10, 12 and 14). However, improved mar performance was observed with 200 Mrad irradiation for all the e-beam active nanoparticles (Examples 9, 11, 13, 15 and 16).

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A method for improving the abrasion resistance of a plastic article, said method comprising:
   (a) providing a composition comprising at least one e-beam active nanoparticle blended with at least one thermoplastic polymeric material selected from the group consisting of polycarbonates, co-polycarbonates, and co-polyestercarbonates to form a mixture;
   (b) forming an article from the mixture of step (a); and
   (c) exposing the article formed in step (b) to an electron beam source,
   wherein the e-beam active nanoparticle comprises at least one inorganic nanoparticle surface-modified with at least one e-beam active functional group, and
   wherein the electron beam source has an operating voltage in the range from about 80 kV to about 20 MV.

2. A method for improving the abrasion resistance of a plastic article, said method comprising:
   (a) providing a composition comprising at least one e-beam active nanoparticle blended with at least one thermoplastic polymeric material selected from the group consisting of polycarbonates, co-polycarbonates, and co-polyestercarbonates to form a mixture;
   (b) forming an article from the mixture of step (a); and
   (c) exposing the article formed in step (b) to an electron beam source,
   wherein the e-beam active nanoparticle comprises at least one inorganic nanoparticle surface-modified with at least one e-beam active functional group, and
   wherein said exposing to an electron beam source results in an electron beam dosage in the range from about 1 Mrad to about 5000 Mrad.

3. The method according to claim 1, wherein said inorganic nanoparticle comprises a metallic component selected from the group consisting of metal oxides, metal nitrides, zero valent metals, mixed metals, mixed metal oxide, mixed metal nitrides, metal oxynitrides, mixed metal oxynitrides, and combinations of two or more of the foregoing.

4. The method according to claim 3, wherein said inorganic nanoparticle comprises a metallic component selected from the group consisting of silicon oxide, aluminum oxide, aluminum silicon oxide, aluminum nitride, boron nitride, antimony oxide, iron oxide, magnesium oxide, zinc oxide, zirconium oxide, titanium oxide, chromium oxide, and mixtures of two or more of the foregoing metal oxides.

5. The method according to claim 1, wherein said inorganic nanoparticle surface-modified with at least one e-beam active functional group comprises structural units derived from at least one organic functionalizing agent, said organic functionalizing agent comprising at least one e-beam active functional group.

6. The method according to claim 5, wherein said organic functionalizing agent is selected from the group consisting of organo-silanes, organo-titanates, organo-zirconates, betadiketones, carboxylic acids, carboxylic acid salts, thiols, and amines.

7. The method according to claim 5, wherein said organic functionalizing agent is a silane.

8. The method according to claim 1, wherein said e-beam active nanoparticle is formed by contacting at least one inorganic nanoparticle with at least one silane having formula (I)

$$R^1_a SiX_b \qquad (I)$$

wherein "a" and "b" are independently at each occurrence an integer from 1 to 3, with the proviso that "a+b"=4; $R^1$ is independently at each occurrence a $C_1$-$C_{20}$ aliphatic radical, a $C_3$-$C_{40}$ cycloaliphatic radical, a $C_3$-$C_{40}$ aromatic radical or an organosiloxane moiety; and X is a halogen, a $C_1$-$C_{10}$ alkoxy radical, or a $NHSiR^2_3$ group, where $R^2$ is independently at each occurrence a $C_1$-$C_{20}$ aliphatic radical, a $C_3$-$C_{40}$ cycloaliphatic radical, or a $C_3$-$C_{40}$ aromatic radical.

9. The method according to claim 8, wherein said inorganic nanoparticle is selected from the group consisting of silicon oxide, aluminum oxide and aluminum silicon oxide.

10. The method according to claim 8, wherein said silane having formula (I) is selected from the group consisting of trimethoxysilane, allyltrimethoxysilane, phenyltrimethoxysilane, benzyltrimethoxysilane, triethoxysilane, allyltriethoxysilane, phenyltriethoxysilane, benzyltriethoxysilane, hexamethyldisilazane, and hexaethyldisilazane.

11. The method according to claim 2, wherein said e-beam active nanoparticle comprises at least one organic nanoparticle selected from the group consisting of adamantane nanoparticles, cubane nanoparticles, nanoparticles comprising derivatives of adamantane, and nanoparticles comprising derivatives of cubane.

12. The method according to claim 2, wherein said e-beam active nanoparticle has a particle size in the range from about 0.5 nm to about 500 nm.

13. The method according to claim 2 wherein said thermoplastic polymeric material comprises a polycarbonate comprising structural units of formula II;

wherein $R^3$ is a divalent $C_2$-$C_{20}$ aliphatic radical, a divalent $C_3$-$C_{40}$ aromatic radical, or a divalent $C_3$-$C_{40}$ cycloaliphatic radical.

14. The method according to claim 13, wherein said polycarbonate is bisphenol A polycarbonate.

15. The method according to claim 2, wherein said thermoplastic polymeric material comprises a copolycarbonate comprising structural units having formula (V);

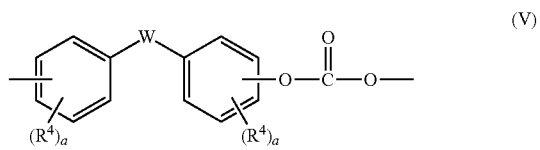

wherein $R^4$ is independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; "a" is independently at each occurrence an integer from 0 to 4; and W is a $C_1$-$C_{20}$ aliphatic radical, a $C_3$-$C_{40}$ cycloaliphatic radical, or a $C_3$-$C_{40}$ aromatic radical.

16. The method according to claim 2, wherein said thermoplastic polymeric material comprises a copolyestercarbonate comprising structural units having formula (VI);

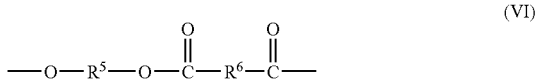

wherein $R^5$ is independently at each occurrence a divalent $C_2$-$C_{20}$ aliphatic radical, a divalent $C_3$-$C_{40}$ aromatic radical, or a divalent $C_3$-$C_{40}$ cycloaliphatic radical; and $R^6$ is independently at each occurrence a divalent $C_1$-$C_{20}$ aliphatic radical, a divalent $C_3$-$C_{40}$ aromatic radical, or a divalent $C_3$-$C_{40}$ cycloaliphatic radical.

17. The method according to claim 16, wherein said copolyestercarbonate comprises structural units having formula (XI);

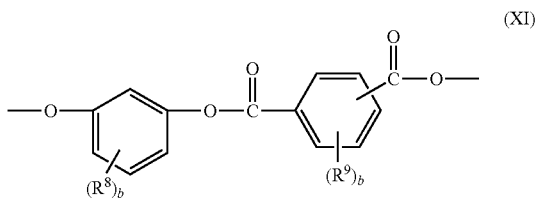

wherein $R^8$ and $R^9$ are independently at each occurrence a halogen atom, a nitro group, a cyano group, a $C_1$-$C_{20}$ aliphatic radical, a $C_3$-$C_{40}$ cycloaliphatic radical, or a $C_3$-$C_{40}$ aromatic radical; and "b" is independently at each occurrence an integer from 0 to 4.

18. The method according to claim 2, wherein said electron beam active nanoparticle is present in an amount corresponding to from about 0.1 weight percent to about 50 weight percent of the composition.

19. The method according to claim 2, wherein said electron beam active nanoparticle is present in an amount corresponding to from about 0.25 weight percent to about 10 weight percent of the composition.

20. The method according to claim 2, wherein step (b) comprises extruding said composition to form an article, which is a film.

21. The method according to claim 20, wherein said film has a thickness in a range from about 10 microns to about 1000 microns.

22. The method according to claim 2, wherein step (b) comprises co-extruding said composition with a second polymeric material to form a multi-layered article.

23. The method according to claim 22, wherein said second polymeric material is selected different from said thermoplastic polymeric material provided in step (a), and said second polymeric material is selected from the group consisting of polycarbonates, co-polycarbonates, co-polyestercarbonates, and combinations thereof.

24. The method according to claim 2, wherein step (b) comprises solvent casting said composition to form a film.

25. The method according to claim 2, wherein said exposing is conducted in the presence of nitrogen or hydrogen.

26. The method according to claim 2, wherein said exposing is conducted in vacuum.

27. The method according to claim 2, wherein the electron beam source has an operating voltage in the range from about 80 kV to about 20 MV.

28. The method according to claim 2, wherein the electron beam source has an operating voltage of about 150 kV.

29. The method according to claim 1, wherein said exposing to an electron beam source results in an electron beam dosage in the range from about 1 Mrad to about 5000 Mrad.

30. An article comprising an abrasion resistant surface; wherein said article is prepared by a method comprising:
   (a) providing a composition comprising at least one e-beam active nanoparticle blended with at least one thermoplastic polymeric material selected from the group consisting of polycarbonates, co-polycarbonates, and co-polyestercarbonates to form a mixture;
   (b) forming an article from the mixture of step (a); and
   (c) exposing the article formed in step (b) to an electron beam source,
   wherein the e-beam active nanoparticle comprises at least one inorganic nanoparticle surface-modified with at least one e-beam active functional group, and
   wherein said exposing to an electron beam source results in an electron beam dosage in the range from about 1 Mrad to about 5000 Mrad.

* * * * *